United States Patent
An et al.

(10) Patent No.: US 10,889,873 B2
(45) Date of Patent: Jan. 12, 2021

(54) COMPLEX-PHASE STEEL SHEET HAVING EXCELLENT FORMABILITY AND METHOD OF MANUFACTURING THE SAME

(71) Applicant: POSCO, Pohang-si (KR)

(72) Inventors: Yeon Sang An, Gwangyang-si (KR); Sang Ho Han, Gwangyang-si (KR)

(73) Assignee: POSCO, Pohang-si (KR)

( * ) Notice: Subject to any disclaimer, the term of this patent is extended or adjusted under 35 U.S.C. 154(b) by 844 days.

(21) Appl. No.: 15/452,383

(22) Filed: Mar. 7, 2017

(65) Prior Publication Data

US 2017/0260602 A1 Sep. 14, 2017

(30) Foreign Application Priority Data

Mar. 8, 2016 (KR) .................. 10-2016-0027874

(51) Int. Cl.
| | |
|---|---|
| *C21D 9/46* | (2006.01) |
| *B32B 15/01* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/22* | (2006.01) |
| *C22C 38/32* | (2006.01) |

(Continued)

(52) U.S. Cl.
CPC .............. *C21D 9/46* (2013.01); *B32B 15/013* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/02* (2013.01); *C22C 38/06* (2013.01); *C22C 38/22* (2013.01); *C22C 38/32* (2013.01); *C22C 38/38* (2013.01); *C23C 2/06* (2013.01); *C23C 2/28* (2013.01); *C23C 2/40* (2013.01); *C21D 2211/002* (2013.01); *C21D 2211/005* (2013.01); *C21D 2211/008* (2013.01)

(58) Field of Classification Search
CPC ...................................................... C21D 9/46
See application file for complete search history.

(56) References Cited

U.S. PATENT DOCUMENTS

| | | |
|---|---|---|
| 2003/0129444 A1 | 7/2003 | Matsuoka et al. |
| 2006/0222882 A1 | 10/2006 | Honda et al. |
| | (Continued) | |

FOREIGN PATENT DOCUMENTS

| | | |
|---|---|---|
| CN | 1717499 A | 1/2006 |
| CN | 1914345 A | 2/2007 |
| | (Continued) | |

OTHER PUBLICATIONS

Chinese Office Action dated Apr. 28, 2018 issued in Chinese Patent Application No. 201710134663.6 (with English translation).

*Primary Examiner* — Jophy S. Koshy
(74) *Attorney, Agent, or Firm* — Morgan, Lewis & Bockius LLP

(57) ABSTRACT

A high strength steel sheet mainly used as an automotive exterior panel material is provided. In detail, a complex-phase steel sheet having excellent formability and a method of manufacturing the same are provided. A steel sheet may have excellent strength and ductility, and a relatively low yield ratio and an excellent surface quality may be provided.

6 Claims, 10 Drawing Sheets

(51) Int. Cl.
   *C22C 38/38*   (2006.01)
   *C23C 2/06*    (2006.01)
   *C23C 2/28*    (2006.01)
   *C23C 2/40*    (2006.01)

(56) References Cited

U.S. PATENT DOCUMENTS

| | | |
|---|---|---|
| 2007/0144633 A1 | 6/2007 | Kizu et al. |
| 2008/0000555 A1 | 1/2008 | Nonaka et al. |
| 2011/0186189 A1 | 8/2011 | Futamura |
| 2013/0233453 A1 | 9/2013 | Kawamura et al. |
| 2016/0186282 A1* | 6/2016 | Han ................. C22C 38/18 |
| | | 428/659 |

FOREIGN PATENT DOCUMENTS

| | | |
|---|---|---|
| CN | 101035921 A | 9/2007 |
| JP | H05-331537 A | 12/1993 |
| JP | 2004-124123 A | 4/2004 |
| JP | 2004-292891 A | 10/2004 |
| JP | 2005-264176 A | 9/2005 |
| JP | 2011-157583 A | 8/2011 |
| JP | 2012-12623 A | 1/2012 |
| KR | 10-2002-0073564 A | 9/2002 |
| KR | 10-2011-0000400 A | 1/2011 |
| KR | 10-2014-0083285 A | 7/2014 |

* cited by examiner x500 x500

COMPLEX-PHASE STEEL SHEET HAVING EXCELLENT FORMABILITY AND METHOD OF MANUFACTURING THE SAME

CROSS-REFERENCE TO RELATED APPLICATION(S)

This application claims benefit of priority to Korean Patent Application No. 10-2016-0027874 filed on Mar. 8, 2016 in the Korean Intellectual Property Office, the disclosure of which is incorporated herein by reference in its entirety.

BACKGROUND

Field

The present disclosure relates to a high strength steel sheet mainly used as an exterior automotive panel material, and more particularly, to a complex-phase steel sheet having excellent formability and a method of manufacturing the same.

High-strength steels have been actively used in order to meet requirements for both lightweightedness and high strength in automobile body components with an emphasis on impact resistance stability regulations and the fuel efficiency of automobiles. With this trend, the application of high strength steels to automotive exterior panels has been further extended.

At present, 340 MPa-grade bake hardened steel is most commonly used in automotive exterior panels, but in some cases, 490 MPa-grade steel sheets have been used therein, and this trend is expected to continue to be extended to 590 MPa-grade steel sheets.

However, as the strength of exterior panels has increased, lightweightedness characteristics and dent resistance have improved, while formability characteristics at the time of processing have deteriorated, due to the increase in strength.

Thus, in order to compensate for insufficient formability while applying high strength steel to exterior panels, steel sheets having a relatively low level yield ratio (YR=YS/TS) and a relatively high level product of tensile strength and ductility (tensile strength (MPa)×ductility (El)) have been required by automobile manufacturers.

On the other hand, in order to be used as automobile exterior panels, a surface quality of steel should be superior to anything else. However, it may be difficult to secure the surface quality of plated steel sheets for exterior panels by silicon (Si), manganese (Mn), or the like, hardenable elements or oxidizing elements added for securing high strength in steel.

In addition, since steel sheets for automobiles are required to have high levels of corrosion resistance, hot-dip galvanized steel sheets having excellent corrosion resistance have been used as steel sheets for automobiles in the related art. Since such hot-dip galvanized steel sheets are manufactured through a continuous hot-dip galvanizing facility in which recrystallization annealing and plating are performed in a single line, steel sheets having excellent corrosion resistance may be produced at relatively low cost.

Further, in the case of galvannealed steel sheets subjected to a heat treatment after hot dip galvanizing, such steel sheets have been widely used due to having excellent weldability and formability, as well as excellent corrosion resistance.

Accordingly, in order to reduce the weight of automotive exterior panels and improve the formability thereof, the development of a high-strength hot-dip galvanized steel sheet having a low yield ratio (YS/TS), excellent surface qualities, excellent corrosion resistance, excellent weldability, excellent strength and ductility is required.

In the related art, in which workability are improved in high-strength steel sheets as described above, a method of manufacturing a high strength steel sheet composed of a complex structure in which martensite is mainly present and precipitated copper particles having a particle diameter of 1 nm to 100 nm are distributed to improve processing characteristics is proposed. However, in the case of such a technique, an excessive Cu content of 2% to 5% should be used to precipitate fine copper (Cu) particles, which may cause the occurrence of a problem in which not only a risk of red-shortness due to Cu but also an excessive increase in manufacturing costs occurs.

Further, in the related art, a method of manufacturing a complex-phase steel sheet having excellent ductility and elongation flangeability, as a steel sheet containing ferrite as a main phase, retained austenite as a second phase, and bainite and martensite as low-temperature transformation phases, is proposed. However, this technique has a problem in which it may be difficult to secure plating quality due to an addition of a large amount of silicon (Si) and aluminum (Al) and it may be difficult to secure surface quality during a steel manufacturing process and a steel continuous casting process. Furthermore, since initial yield strength (YS) is relatively high due to transformation induced plasticity, a yield ratio is high, and it may be difficult to secure an exterior-panel level of plating surface quality using silicon (Si) and aluminum (Al) added in large amounts in order to form retained austenite.

On the other hand, in the related art in which a high-strength hot-dip galvanized steel sheet having good workability is provided, a method of manufacturing a hot dip galvanized steel sheet having an improved elongation percentage and r value (Lankford value), as a steel sheet having a composite structure of soft ferrite and hard martensite, is proposed. However, in this case, since a large amount of Si is added, it may be difficult to secure excellent plating qualities, and further, in the case that a large amount of titanium (Ti), vanadium (V), molybdenum (Mo), or the like is added, manufacturing costs may be increased.

SUMMARY

An aspect of the present disclosure is to provide a steel sheet in which excellent formability may be secured, together with high strength from an alloying constituent composition and manufacturing conditions suitable therefor, and excellent surface qualities may be provided while having a relatively low yield ratio, and a method of manufacturing the same.

According to an aspect of the present disclosure, a complex-phase steel sheet having excellent formability includes: by weight %, 0.02% to 0.1% of carbon (C), 1.3% to 2.0% of manganese (Mn), 0.2% or less (excluding 0%) of silicon (Si), 0.5% to 1.5% of chromium (Cr), 0.1% or less (excluding 0%) of phosphorus (P), 0.01% or less (excluding 0%) of sulfur (S), 0.01% or less (excluding 0%) of nitrogen (N), 0.01% to 0.06% of soluble aluminum (sol.Al), 0.2% or less (excluding 0%) of molybdenum (Mo), 0.003% or less (excluding 0%) of boron (B), and iron (Fe) and inevitable impurities as remainders thereof; and by an area fraction, ferrite (F) of 80% or more, martensite (M) of 20% or less (excluding 0%), and bainite (B) of 5% or less, as a microstructure. In a matrix structure at a thickness ¼T point of the steel sheet, a ratio ($C_M/C_F$) of a carbon (C) average concentration ($C_M$) in a martensite phase and a C average concentration ($C_F$) in a ferrite phase is 50 or less, and a ratio ($Cr_F/C_F$) of a Cr average concentration ($Cr_F$) in a ferrite phase and a C average concentration ($C_F$) in a ferrite phase is 60 or more, where in ¼T, T indicates a thickness (mm) of the complex-phase steel sheet.

According to an aspect of the present disclosure, a method of manufacturing a complex-phase steel sheet having excellent formability, includes: preparing a steel slab satisfying the component composition above; reheating the steel slab; performing finishing hot rolling on the reheated steel slab, in a temperature range of Ar3+50° C. to 950° C., to produce a hot-rolled steel sheet; coiling the hot-rolled steel sheet in a temperature range of 400° C. to 650° C.; cold rolling the coiled hot-rolled steel sheet at a reduction ratio of 40% to 80% to produce a cold-rolled steel sheet; performing continuous annealing on the cold-rolled steel sheet in a temperature range of 770° C. to 850° C.; performing primary cooling in which the cold-rolled steel sheet having been subjected to the continuous annealing is cooled to a temperature within a range of 630° C. to 670° C. at an average cooling rate of 2° C./s to 20° C./s; performing secondary cooling in which the steel sheet having been subjected to the primary cooling is cooled to a temperature within a range of Ms (martensitic transformation start temperature)−20° C. to Ms+50° C. at an average cooling rate of 3° C./s to 100° C./s; and performing skin pass rolling to 2% or less on the cold-rolled steel sheet having been subjected to the secondary cooling.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
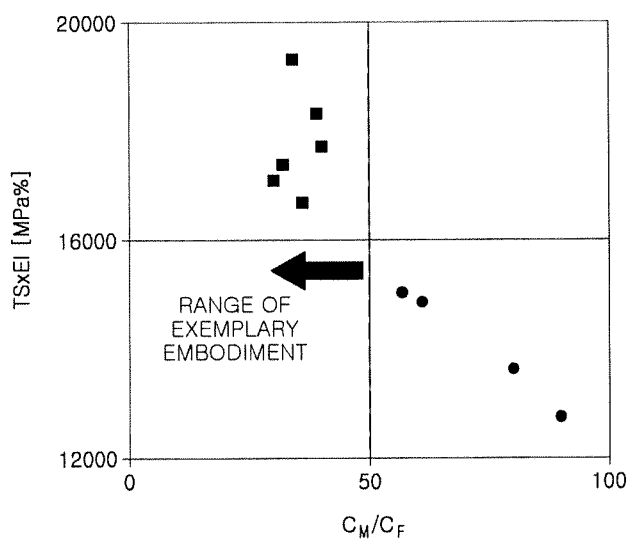
FIG. 1 is a graph illustrating a change in tensile strength× ductility (TS×El) value, based on a ratio ($C_M/C_F$) of a C average concentration in an M phase ($C_M$) and a C average concentration in an F phase ($C_F$), in a matrix structure at a thickness ¼t point, according to an exemplary embodiment in the present disclosure.
Figure 2:
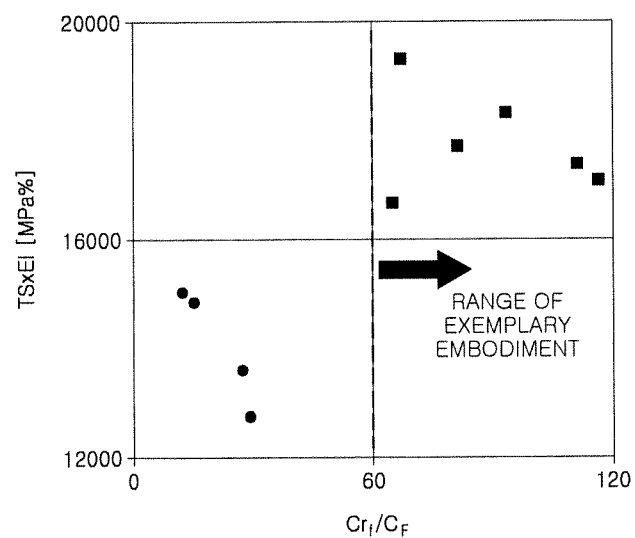
FIG. 2 is a graph illustrating a change in tensile strength× ductility (TS×El) value, based on a ratio ($Cr_F/C_F$) of a Cr average concentration in an F phase ($Cr_F$) and a C average concentration in an F phase ($C_F$), in a matrix structure at a thickness ¼t point, according to an exemplary embodiment in the present disclosure.
Figure 3:
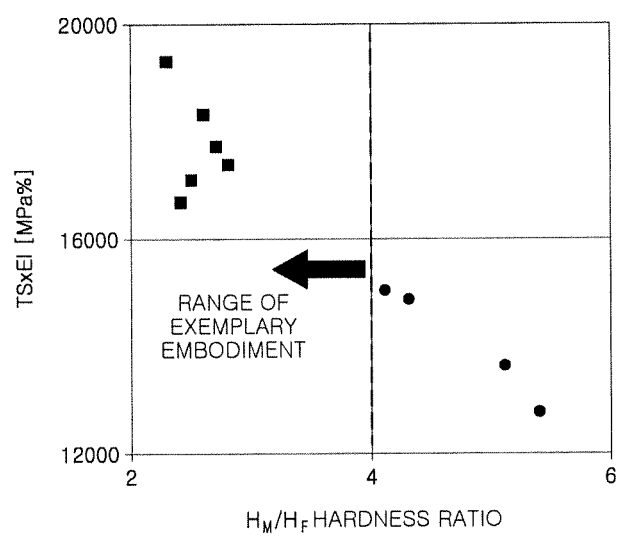
FIG. 3 is a graph illustrating a change in tensile strength× ductility (TS×El) value, based on a ratio ($H_M/H_F$) of hardness of an M phase ($H_M$) and hardness of an F phase ($H_F$), in a matrix structure at a thickness ¼t point, according to an exemplary embodiment in the present disclosure.
Figure 4:
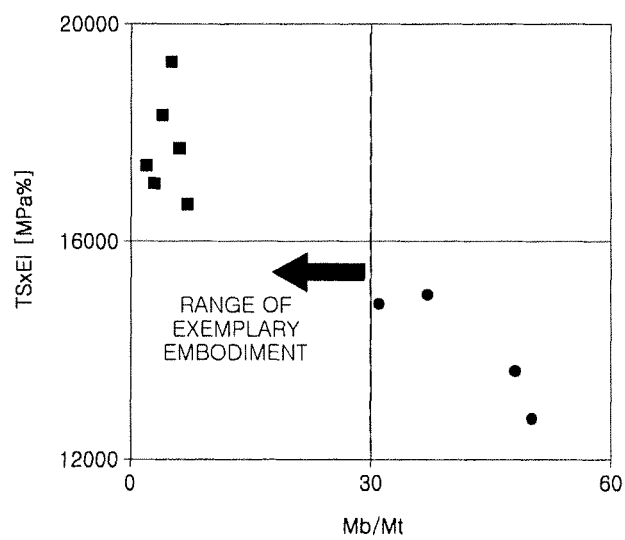
FIG. 4 is a graph illustrating a change in tensile strength× ductility (TS×El) value, based on a ratio ($M_b/M_t$) of an M phase ($M_b$) having a band shape to a total fraction of an M phase ($M_t$), in a matrix structure at a thickness ¼t point, according to an exemplary embodiment in the present disclosure.
Figure 5:
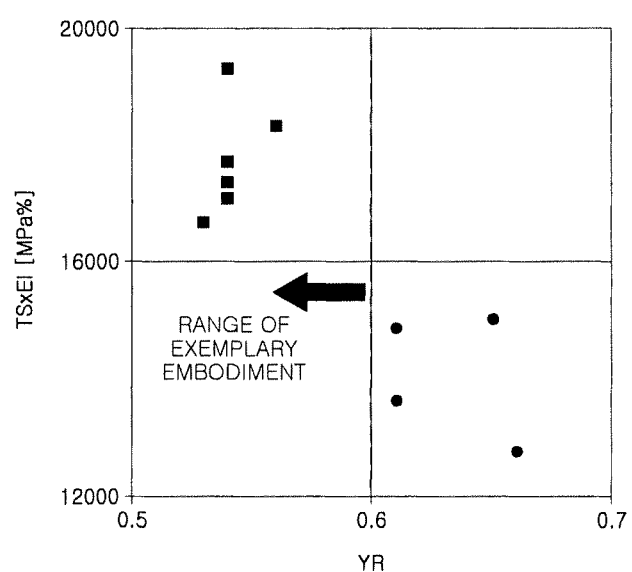
FIG. 5 is a graph illustrating a change in tensile strength× ductility (TS×El) value, based on a yield ratio (YR, YS/TS), according to an exemplary embodiment in the present disclosure.
Figure 6:
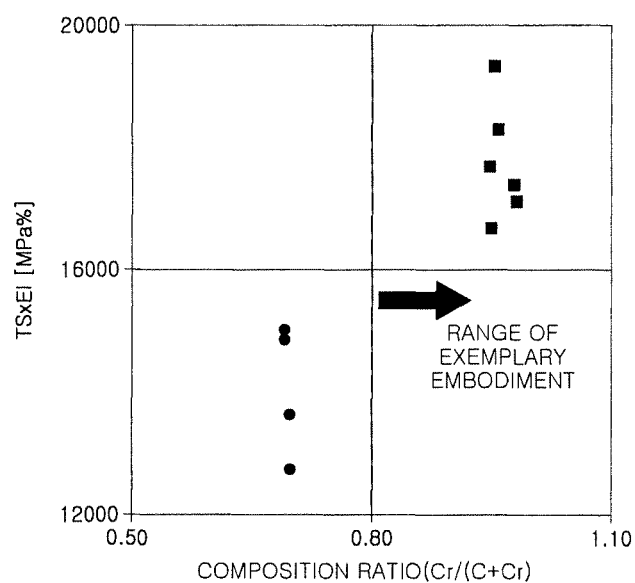
FIG. 6 is a graph illustrating a change in tensile strength× ductility (TS×El) value, based on relational expression 1 (Cr/(C+Cr)), according to an exemplary embodiment in the present disclosure.

Hereinafter, embodiments of the present disclosure will be described with reference to the accompanying drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below may be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

A scheme in which a steel sheet having a relatively low yield ratio while securing excellent formability of high strength steel used as an existing automobile exterior panel material, and having excellent surface qualities in plating, has been intensively studied by the present inventors. As a result, when a structure suitable therefor, as above, is secured by providing a required appropriate steel alloy composition and manufacturing conditions, a steel sheet required according to an exemplary embodiment in the present disclosure may be obtained.

In detail, a fraction of a hard phase and a soft phase may be appropriately controlled by providing hot-rolling and annealing conditions suitable therefor while reducing the content of relatively expensive alloying elements. Furthermore, by decreasing a carbon (C) concentration in a martensite phase and increasing a chromium (Cr) concentration in a ferrite phase, a microstructure having a relatively low hardness difference between phases may be secured, thereby providing technical significance in improving formability thereof.

Hereinafter, exemplary embodiments will be described in detail.

According to an exemplary embodiment, a complex-phase steel sheet having excellent formability may include, by weight % in an alloy composition, 0.02% to 0.1% of carbon (C), 1.3% to 2.0% of manganese (Mn), 0.2% or less (excluding 0%) of silicon (Si), 0.5% to 1.5% of chromium (Cr), 0.1% or less (excluding 0%) of phosphorus (P), 0.01% or less (excluding 0%) of sulfur (S), 0.01% or less (excluding 0%) of nitrogen (N), 0.01% to 0.06% of soluble aluminum (sol.Al), 0.2% or less (excluding 0%) of molybdenum (Mo), and 0.003% or less (excluding 0%) of boron (B).

Hereinafter, the reason for controlling an alloy component of a complex-phase steel sheet according to an exemplary embodiment will be described in detail, and unless otherwise stated, the contents of respective components are based on weight %.

0.02% to 0.1% of C

Carbon (C) may be an important component in producing a steel sheet having a complex-phase of structure, and may be an element required to secure strength by forming martensite, one of two-phase structures.

As the content of C increases, it may be generally easy to form martensite, in detail, in producing a complex-phase steel. However, the content of C may be required to have an appropriate content in order to control a required strength and yield ratio (YS/TS). In detail, as the C content increases, bainite transformation occurs simultaneously with cooling after annealing, a yield ratio of steel may be increased. Thus, in an exemplary embodiment of the present disclosure, it may be important to significantly reduce formation of bainite and form an appropriate level of martensite, to secure required material properties.

Thus, in the exemplary embodiment, the content of C may be controlled to be 0.02% or more. If the content of C is less than 0.02%, it may be difficult to form an appropriate level of martensite in the exemplary embodiment and thus may be difficult to secure required 590 MPa-grade strength. On the other hand, if the content of C exceeds 0.1%, the bainite formation may be promoted during cooling after annealing, and yield strength may thus be increased, such that a yield ratio is increased and bending and surface defects may easily occur in the processing of automobile components.

Thus, in the exemplary embodiment, the content of C may be controlled to be 0.02% to 0.1%, in detail, 0.02% to 0.08%.

1.3% to 2.0% of Mn

Manganese (Mn) may be an element improving hardenability in a steel sheet having a complex-phase, and in detail, may be an important element in forming martensite. In detail, in solid solution strengthened steel, manganese (Mn) may be effective in increase strength through a solid solution strengthening effect, and may be an important element in suppressing sheet breakage and high temperature embrittlement caused by sulfur (S) during hot rolling, by precipitating S inevitably added to steel as MnS.

In the exemplary embodiment, Mn of 1.3% or more may be added. If the content of Mn is less than 1.3%, martensite may not be formed, and thus it may be difficult to produce a complex-phase steel. On the other hand, if the content of Mn exceeds 2.0%, martensite may be excessively formed, the quality of steel may not be satisfied, and a Mn-Band, for example, a band of Mn oxide, may be formed in a structure thereof, to increase a risk of occurrence of processing cracks and steel fracture. In addition, a problem in which Mn oxide is eluted on a surface during annealing to greatly deteriorate plating characteristics may occur.

Thus, in the exemplary embodiment, the content of Mn may be limited to 1.3% to 2.0%.

0.2% or Less (Excluding 0%) of Si

Silicon (Si) may be a useful element capable of securing strength without reducing ductility of a steel sheet, and may also be an element promoting formation of martensite by promoting ferrite formation and promoting C concentration in untransformed austenite.

However, if the content of Si exceeds 0.2%, a quality of plated surface may be inferior and surface qualities required of an exterior panel material may not be secured.

Thus, the content of Si may be limited to 0.2% or less, and in the exemplary embodiment, although physical properties may be secured even without the addition of Si, 0% may be excluded, considering an amount of Si inevitably added during a manufacturing process.

0.5% to 1.5% of Cr

Chromium (Cr) may be a component having properties similar to those of Mn described above, and may be an element added to improve hardenability of steel and secure high strength in steel. Such Cr may be effective for the formation of martensite, and may significantly reduce a decrease in elongation caused as compared to increase in strength to thus manufacture a complex-phase steel having relatively high ductility. In detail, a Cr-based carbide such as $Cr_{23}C_6$ may be formed in a hot rolling process, and this carbide may be partially dissolved in an annealing process, while a portion thereof may be left without being dissolved, such that an amount of solid solution C in martensite after cooling may be controlled to a proper level or below, thereby suppressing the occurrence of yield point elongation (YP-El). Thus, a complex-phase steel having a relatively low yield ratio may be manufactured.

In the exemplary embodiment, since Cr may facilitate formation of martensite through improvement of hardenability, Cr may be added in an amount of 0.5% or more. Meanwhile, if the content of Cr exceeds 1.5%, since a rate of formation of martensite is excessively increased, a fraction of Cr-based carbide is increased and the carbide becomes coarse, the size of martensite may become coarse after annealing, resulting in a problem such as a decrease in an elongation rate.

Thus, in the exemplary embodiment, the content of Cr may be controlled to be 0.5% to 1.5%.

0.1% or Less (Excluding 0%) of P

Phosphorous (P) in steel may be an element relatively useful for securing strength without greatly deteriorating formability, while in the case of the use of an excessive amount of P, the possibility of the occurrence of brittle fractures may significantly increase, to thus increase the possibility of the occurrence of steel fracture of a slab during hot rolling, and furthermore, an excessive amount of P may act as an element deteriorating plating surface characteristics.

Thus, in the exemplary embodiment, the content of P may be limited to a maximum amount of 0.1%, but 0% may be excluded, considering an amount of P added inevitably.

0.01% or Less (Excluding 0%) of S

Sulfur (S) may be an impurity element in steel, and it may be important to manage a content of S in a relatively low amount. In detail, since S in steel has a problem of increasing the possibility of the occurrence of red shortness, the content of S may be controlled to be 0.01% or less. However, 0% may be excluded by considering an amount of S inevitably added during a manufacturing process.

0.01% or Less (Excluding 0%) of N

Nitrogen (N) may be an impurity element in steel, as an inevitably added element. In the case of N as above, it may be important to manage a content of N in a relatively low amount, but there may be a problem in which a steel refining cost sharply increases to manage as a low content. Thus, the content of N may be controlled to be 0.01% or less as a range in which an operating condition may be carried out. However, 0% may be excluded considering an amount of N added inevitably.

0.01% to 0.06% of Sol.Al

Soluble aluminum (sol.Al) may be an element added for miniaturization of grain size and deoxidation of steel.

If the content of sol.Al is less than 0.01%, Al-killed steel may not be manufactured in a normal stable state. On the other hand, if the content of sol.Al exceeds 0.06%, the strength of steel may increase due to a grain refinement effect, but a possibility that a defective surface of plated steel sheet will occur may be increased due to excessive formation of inclusions during a steel making continuous-casting operation. Furthermore, manufacturing costs may be increased.

Thus, in the exemplary embodiment, the content of sol.Al may be controlled to be 0.01 to 0.06%.

0.2% or Less (Excluding 0%) of Mo

Molybdenum (Mo) may be an element added to improve refinement of ferrite and strength while retarding transformation of austenite into pearlite. Such Mo may improve hardenability of steel to finely form martensite in grain boundaries such that a yield ratio may be controlled, while since Mo is an expensive element, negative properties in terms of production of steel may be provided in the case in which the content of Mo is increased. Thus, the content of Mo needs to be appropriately controlled.

In order to obtain the above-described effect in the exemplary embodiment, Mo may be added in a maximum amount of 0.2%. If the content of Mo exceeds 0.2%, the cost of an alloy may be rapidly increased and economical efficiency may thus be lowered. Further, in this case, the ductility of steel may be deteriorated due to excessive grain refining and solid solution strengthening effects.

Thus, in the exemplary embodiment, the content of Mo may be controlled to be 0.2% or less.

On the other hand, 0.05% of Mo may be a further appropriate level, but even in the case that the amount of 0.05% is not necessarily added, required physical properties may be secured. However, 0% may be excluded, considering an amount of Mo inevitably added during a manufacturing process.

0.003% or Less (Excluding 0%) of B

Boron (B) may be a component retarding transformation of austenite into pearlite in a process of cooling during annealing. If the content of B exceeds 0.003%, an excessive amount of B may be concentrated on a surface, which may lead to deterioration of plating adhesion.

Thus, in the exemplary embodiment, the content of B may be controlled to be 0.003% or less, and in this case, 0% may be excluded, considering an amount of B added inevitably.

In the exemplary embodiment, iron (Fe) may be provided as a remainder thereof. However, in an ordinary steel manufacturing process, impurities not intended may be inevitably incorporated from a raw material or a surrounding environment. These impurities are commonly known in the art of steelmaking, and are thus not specifically mentioned in this specification.

A complex-phase steel sheet having the alloy composition as described above according to an exemplary embodiment may have a microstructure in which ferrite (F) of 80% or more, martensite (M) of 20% or less (excluding 0%) and bainite (B) of 5% or less, in an area fraction, may be included.

In the exemplary embodiment, it may be important to control a fraction of a bainite phase between two phases except for ferrite that is a matrix structure, to be relatively low. For example, in the case of bainite, compared with martensite, C and N, solid-solution elements present in a bainite grain, may be easily adhered to an electric potential to thus interfere with movement of the electric potential and exhibit discontinuous behavior, and thus, a yield ratio may be significantly increased.

Thus, the fraction of a bainite phase in two phases of the microstructure may be controlled to be 5% or less, and when the control to 5% or less is satisfied, a product of tensile strength (MPa) and elongation (%) (tensile strength×elongation) may satisfy 16000 MPa % or more while having a yield ratio of 0.6 or less.

In addition, in the microstructure, a fraction of martensite may be controlled to be 20% or less, and a fraction of ferrite may be controlled to be 80% or more. If the martensite fraction exceeds 20% and the ferrite fraction is less than 80%, since the strength may become excessively high, it may be difficult to secure formability.

In further detail, the martensite fraction may be 15% or less.

Meanwhile, in the exemplary embodiment, a structural phase fraction as above may be provided, and further, a content relationship between Cr and C in a matrix structure at a point at which a steel sheet has a thickness of ¼T, where 'T' refers to a thickness (mm), may satisfy the following Relational Expression 1.

$$Cr/(C+Cr) \geq 0.8 \quad \text{[Relational Expression 1]}$$

In the above relational expression 1, Cr and C indicate weight contents of respective elements.

For example, a fine structure may be secured in a process of manufacturing a steel sheet required according to an exemplary embodiment. In detail, a structure in which cementite are finely dispersed may be obtained by providing appropriate manufacturing conditions, in detail, an appropriate temperature range at the time of performing a coiling process in addition to relationship between contents of Cr and C in a predetermined point of the steel sheet. As described above, since the finely dispersed cementite may become an austenite nucleation site during annealing in a subsequent process, when the annealing is performed by controlling a temperature range, a structure in which fine martensite is uniformly dispersed may be obtained. In addition, an effect of suppressing formation of a martensite band (M-band) after annealing may be obtained.

As described above, by controlling component relations and the manufacturing conditions, a C concentration in a finally produced martensite phase may be lowered, and a Cr concentration in a ferrite phase may be increased, thereby securing a microstructure having a relatively low level of hardness difference between phases. In addition, by providing a structure in which fine martensite is dispersed in ferrite without a martensitic band structure, while significantly reducing a bainite fraction, deformation may be started in an early stage of plastic deformation at relatively low stress, a yield ratio may be lowered, and a strain hardening rate may be relatively high. As a result, local stress and strain may be alleviated to thus delay formation, growth, and coalescence of pores, thereby improving ductility. Thus, a product of tensile strength and ductility may be increased while providing a relatively low yield ratio, and thus, a steel sheet having excellent formability may be obtained.

In further detail, in the case of a steel sheet according to an exemplary embodiment, concentrations of C and Cr in a matrix structure at a thickness ¼T point may be controlled as follows.

First, in a matrix structure, a ratio ($C_M/C_F$) of a C average concentration ($C_M$) in a martensite (M) phase and a C average concentration ($C_F$) in a ferrite (F) phase may be 50 or less, and a ratio ($Cr_F/C_F$) of a Cr average concentration ($Cr_F$) in a ferrite (F) phase and a C average concentration ($C_F$) in a ferrite (F) phase may be 60 or more.

In addition, a ratio ($H_M/H_F$) of hardness ($H_M$) of a martensite (M) phase and hardness ($H_F$) of a ferrite (F) phase may satisfy 4 or less, and simultaneously therewith, a ratio (Mb/Mt) of fraction (Mb) of a martensite phase having a band shape to a total fraction (Mt (total)) of a martensite phase may satisfy 30 or less.

For example, when the conditions as above are all satisfied, a complex-phase steel having excellent formability, in which a yield ratio (YR=YS/TS) is relatively low as 0.6 or less, and a product of tensile strength (TS) and ductility (El) (tensile strength (MPa)×ductility (%)) is 16000 MPa % or more, may be manufactured with characteristics according to an exemplary embodiment.

The complex-phase steel sheet according to the exemplary embodiment may be a cold rolled steel sheet, a hot-dip galvanized steel sheet, or an alloyed galvannealed steel sheet.

Hereinafter, a method of manufacturing a complex-phase steel sheet having excellent formability according to another exemplary embodiment in the present disclosure will be described in detail.

First, a steel slab satisfying the above-mentioned alloy composition may be prepared, and may then be reheated under normal conditions.

The reheating process may be a process to smoothly perform a subsequent rolling process and obtain sufficient physical properties required by a steel sheet according to an exemplary embodiment. Conditions of the reheating process according to an exemplary embodiment are not particularly limited. However, reheating may be performed under normal reheating conditions, for example, within a temperature range of 1100° C. to 1300° C.

The reheated steel slab may be finishing hot-rolled at an Ar3 transformation point or higher to thus manufacture a hot-rolled steel sheet.

In detail, the finish hot rolling may be performed in a temperature range of Ar3+50° C. to 950° C. If the temperature is lower than Ar3+50° C., since transformation starts at a low temperature, a rolling load may be excessive, while if the temperature exceeds 950° C., hot-rolled oxide may be excessively formed and plating properties may thus be deteriorated.

As an example, the finishing hot rolling may be performed in a temperature range of 800° C. to 950° C.

The hot-rolled steel sheet manufactured in the manner as described above may be coiled in a predetermined temperature range.

The coiling process may be a process to obtain finely dispersed cementite as described above, and may be performed, in detail, in a temperature range of 400° C. to 650° C. Since the finely dispersed cementite may become austenite nucleation sites in a subsequent annealing process, a structure in which fine martensite are uniformly dispersed may be obtained.

If a coiling temperature is lower than 400° C., martensite or bainite may be excessively generated, thereby causing an excessive increase in strength of a hot-rolled steel sheet, which may cause manufacturing problems such as defects in shape, and the like, due to load during subsequent cold rolling. On the other hand, if the temperature exceeds 650° C., a pearlite band structure may be formed, and as a martensite band structure is formed after annealing, ductility may be lowered. In addition, a problem in which surface concentration due to elements lowering wettability of hot dip galvanizing, such as silicon (Si), manganese (Mn), boron (B), or the like, is increased may occur.

Thus, in the exemplary embodiment, the coiling temperature may be limited to 400° C. to 650° C., and in detail, the coiling may be performed within a temperature range of 450° C. to 600° C.

Then, the hot rolled steel sheet coiled as above may be subjected to a pickling process and may then be cold-rolled at a reduction ratio of 40% to 80% to thus produce a cold-rolled steel sheet.

In this case, if a cold rolling reduction ratio is less than 40%, it may be difficult to secure a required thickness, and may also be difficult to correct a shape of the steel sheet. On the other hand, if the cold rolling reduction ratio exceeds 80%, the possibility of the occurrence of cracks in an edge of the steel sheet may be increased, which may lead to a cold rolling load.

The cold-rolled steel sheet produced as described above may be continuously annealed in a predetermined temperature range, and in this case, a continuous annealing furnace or an alloyed hot-dip galvanizing furnace may be used.

A continuous annealing process as above may be a process to form ferrite and austenite simultaneously with recrystallization and to decompose carbon. In detail, the continuous annealing process may be performed in a temperature range of 770° C. to 850° C.

If a continuous annealing temperature is less than 770° C., sufficient recrystallization may not be obtained, and furthermore, sufficient formation of austenite may not be obtained. Thus, strength of steel required according to the exemplary embodiment may not be secured. On the other hand, if the continuous annealing temperature exceeds 850° C., a large amount of bainite may be contained therein after cooling due to excessive austenite formation, as well as a decrease in productivity. Thus, ductility of a steel sheet may be deteriorated. In addition, a surface concentration due to elements lowering wettability of hot dip galvanizing, such as silicon (Si), manganese (Mn), boron (B) or the like, may become serious, and a plated surface quality may thus be deteriorated.

Thus, in the exemplary embodiment, a temperature range of continuous annealing may be limited to 770° C. to 850° C.

Subsequently, a cold-rolled steel sheet having been subjected to the continuous annealing process may be subjected to primary cooling in which the cold-rolled steel sheet is cooled to a temperature within a range of 630° C. to 670° C. at an average cooling rate of 2° C./s to 20° C./s, and then subjected to secondary cooling in which the steel sheet is cooled to a temperature within a range of Ms (martensitic transformation start temperature)–20° C. to Ms+50° C. at an average cooling rate of 3° C./s to 100° C./s. At this time, the secondary cooling may be performed at a faster cooling rate than a cooling rate of the primary cooling.

Multistage cooling in cooling as above may be performed to obtain a microstructure required according to an exemplary embodiment.

In this case, if the temperature range in the primary cooling does not satisfy 630° C. to 670° C., pearlite may be excessively formed or coarse ferrite may be formed, and if the cooling rate at this time is relatively low, to be less than 2° C./s, since pearlite may be excessively formed, it may be difficult to secure strength of the steel sheet required according to an exemplary embodiment. Further, in this case, if the cooling rate exceeds 20° C./s, a hard phase such as martensite, bainite, or the like may be excessively formed to deteriorate formability.

In addition, in the secondary cooling after the primary cooling as described above, if the temperature range does not satisfy a range of Ms–20° C. to Ms+50° C., there is a possibility that bainite will be formed in an area exceeding 5% by area and coarse martensite will be formed. In addition, if the cooling rate at this time is too low, to be less than 3° C./s, there is a possibility that a bainite phase may be excessively formed, and if the cooling rate is too fast, to exceed 100° C./s, a martensite phase may be excessively formed.

The primary cooling may be performed at a cooling rate of 2 to 15° C./s, and secondary cooling may be performed at a cooling rate of 10 to 50° C./s.

The cold-rolled steel sheet having been subjected to the secondary cooling, as above, may further be subjected to skin pass rolling to 2% or less, and thus, a shape of the steel sheet may be controlled.

Meanwhile, the cold-rolled steel sheet having been primarily cooled under the conditions described above may be hot-dip galvanized in a temperature range of 400° C. to 500° C., thereby manufacturing a hot-dip galvanized steel sheet, and may then further be subjected to skin pass rolling to 2% or less.

In this case, the temperature range described above may be conditions for hop-dip galvanizing. If the temperature is lower than 400° C., the hot dip galvanizing may not be sufficiently performed, while if the temperature is higher than 500° C., hot dip galvanizing may occur excessively, and thus, a plating layer may not be uniformly formed.

The hot dip galvanizing may be performed using a continuous annealing furnace, and in this case, the cold-rolled steel sheet having been primarily cooled after annealing may pass through an overaging section. As the cold rolled steel sheet passes through the overaging section, the cold-rolled steel sheet may be cooled to a temperature within a range for hot-dip plating at a cooling rate of 20° C./s or less.

In addition, an alloyed galvanneled steel sheet may be manufactured by performing an alloying heat treatment on the hot-dip galvanized steel sheet obtained as above.

The alloying heat treatment may be performed in a temperature range of 440° C. to 580° C., and if the temperature is outside of the temperature range of 440° C. to 580° C., alloying may be unstable such that required plating properties may not be obtained.

After the alloying heat treatment is performed, the alloyed galvanneled steel sheet may be cooled to a temperature within a range of Ms to 100° C. at an average rate of 3° C./s or more. Then, skin pass rolling to 2% or less may be further carried out.

Exemplary Embodiment

Steel slabs having a composition illustrated in the following Table 1 were prepared, reheated in a temperature range of 1050° C. to 1250° C., and then subjected to finishing hot rolling at 850° C. to 950° C., equal to or more than an Ar3 transformation-point temperature. Whereby, hot-rolled steel sheets were produced. Then, the hot-rolled steel sheets were respectively pickled, coiled under conditions illustrated in Table 2, and then cold-rolled at a reduction ratio of 40% to 80%, to produce cold-rolled steel sheets. Subsequently, the cold-rolled steel sheets were respectively subjected to continuous annealing under conditions illustrated in the following Table 2, were cooled, and were then subjected to skin pass rolling to 2% or less, to thereby control shapes of the steel sheets.

In this case, the cooling were carried out by performing primary cooling, for example, at a temperature from 630° C. to 670° C. at an average cooling rate of 2° C./s to 20° C./s, and then performing secondary cooling, for example, at a temperature from Ms–20° C. to Ms+50° C. at an average cooling rate of 3° C./s to 100° C./s, within the range proposed by the exemplary embodiment.

For the respective cold-rolled steel sheets prepared as described above, mechanical properties, plating characteristics, and microstructural characteristics were evaluated, and results thereof are illustrated in Table 3 below.

In this case, a tensile test for each test piece was performed in a C direction perpendicular to a rolling direction, using the JIS standard.

A microstructure fraction was obtained by analyzing a matrix structure at a plate thickness ¼T point of a continuous annealed steel sheet. In detail, fractions of martensite, bainite, ferrite and band-shaped martensite were measured using FE-SEM and an image analyzer after nital corrosion.

On the other hand, concentrations of C and Cr in a ferrite phase and a martensite phase present in the matrix structure were measured using transmission electron microscopy (TEM), energy dispersive spectroscopy (EDS) and electron energy loss spectroscopy (EELS) analysis equipment. Levels of hardness of the ferrite phase and the martensite phase were measured ten times using a Vickers micro hardness tester, and thus, an average value thereof was obtained.

In addition, the cold-rolled steel sheets have been subjected to the primary annealing treatment after a continuous annealing treatment were subjected to hot-dip galvanizing in a zinc plating bath at 460° C., and it was visually confirmed as to whether or not unplated portions occurred.

TABLE 1

| Classification | Composition (weight %) | | | | | | | | | | | Relational Expression 1 |
|---|---|---|---|---|---|---|---|---|---|---|---|---|
| | C | Si | Mn | Cr | P | S | N | sol. Al | Mo | B | | |
| Inventive Steel 1 | 0.05 | 0.05 | 1.80 | 0.85 | 0.015 | 0.005 | 0.005 | 0.025 | 0.05 | 0.0006 | | 0.94 |
| Inventive Steel 2 | 0.04 | 0.12 | 1.85 | 0.70 | 0.050 | 0.005 | 0.006 | 0.035 | 0.05 | 0.0005 | | 0.95 |
| Inventive Steel 3 | 0.05 | 0.08 | 1.62 | 1.14 | 0.030 | 0.007 | 0.007 | 0.043 | 0.05 | 0.0003 | | 0.96 |
| Inventive Steel 4 | 0.04 | 0.09 | 1.59 | 1.36 | 0.040 | 0.004 | 0.004 | 0.041 | 0.05 | 0.0006 | | 0.97 |
| Comparative Steel 1 | 0.09 | 0.25 | 1.85 | 0.20 | 0.120 | 0.006 | 0.005 | 0.052 | 0.07 | 0.0012 | | 0.69 |
| Comparative Steel 2 | 0.13 | 0.30 | 1.78 | 0.30 | 0.120 | 0.007 | 0.009 | 0.057 | 1.2 | 0.0013 | | 0.70 |

In Table 1, the relational expression 1 represents a value of a component relation (Cr/(C+Cr)) of Cr and C in a matrix structure, and contents of Cr and C were measured using an optical emission spectrometer (OES).

TABLE 2

| Steel Type | coiling Temperature (° C.) | Annealing Temperature (° C.) | Classification |
|---|---|---|---|
| Inventive Steel 1 | 560 | 810 | Inventive Example 1 |
| Inventive Steel 2 | 570 | 810 | Inventive Example 2 |
| Inventive Steel 2 | 480 | 830 | Inventive Example 3 |
| Inventive Steel 3 | 520 | 810 | Inventive Example 4 |
| Inventive Steel 4 | 600 | 810 | Inventive Example 5 |
| Inventive Steel 4 | 450 | 830 | Inventive Example 6 |
| Comparative Steel 1 | <u>720</u> | 810 | Comparative Example 1 |
| Comparative Steel 1 | 540 | <u>870</u> | Comparative Example 2 |
| Comparative Steel 2 | <u>700</u> | <u>760</u> | Comparative Example 3 |
| Comparative Steel 2 | 560 | 830 | Comparative Example 4 |

TABLE 3

| Classification | Mechanical Properties | | | | | Microstructure fraction | | | Phase Fraction | Hardness | Concentration | | Presence or Absence |
|---|---|---|---|---|---|---|---|---|---|---|---|---|---|
| | YS (MPa) | TS (MPa) | El (%) | YR | TS × El (MPa %) | F (%) | M (%) | B (%) | Ratio(%) Mb/Mt | Ratio $H_M/H_F$ | Ratio $C_M/C_F$ | $Cr_F/C_F$ | of Unplating |
| Inventive Example 1 | 318 | 591 | 30.0 | 0.54 | 17730 | 84 | 15 | 1 | 6 | 2.7 | 40 | 81 | Absence |
| Inventive Example 2 | 312 | 592 | 28.2 | 0.53 | 16694 | 86 | 14 | 0 | 7 | 2.4 | 36 | 65 | Absence |

TABLE 3-continued

| | Mechanical Properties | | | | Microstructure fraction | | | Phase Fraction | Hardness | Concentration | | Presence or Absence |
|---|---|---|---|---|---|---|---|---|---|---|---|---|
| | YS | TS | El | | TS × El | F | M | B | Ratio(%) | Ratio | Ratio | | of |
| Classification | (MPa) | (MPa) | (%) | YR | (MPa %) | (%) | (%) | (%) | Mb/Mt | $H_M/H_F$ | $C_M/C_F$ | $Cr_F/C_F$ | Unplating |
| Inventive Example 3 | 318 | 593 | 32.6 | 0.54 | 19332 | 84 | 15 | 1 | 5 | 2.3 | 34 | 67 | Absence |
| Inventive Example 4 | 351 | 630 | 29.1 | 0.56 | 18333 | 85 | 13 | 2 | 4 | 2.6 | 39 | 93 | Absence |
| Inventive Example 5 | 327 | 602 | 28.9 | 0.54 | 17398 | 90 | 10 | 0 | 2 | 2.8 | 32 | 111 | Absence |
| Inventive Example 6 | 326 | 600 | 28.5 | 0.54 | 17100 | 87 | 12 | 1 | 3 | 2.5 | 30 | 116 | Absence |
| Comparative Example 1 | 364 | 595 | 25.0 | 0.61 | 14875 | 73 | 21 | 6 | 31 | 4.3 | 61 | 15 | Presence |
| Comparative Example 2 | 409 | 632 | 23.8 | 0.65 | 15042 | 75 | 18 | 7 | 37 | 4.1 | 57 | 12 | Presence |
| Comparative Example 3 | 365 | 598 | 22.8 | 0.61 | 13634 | 73 | 19 | 8 | 48 | 5.1 | 80 | 27 | Presence |
| Comparative Example 4 | 416 | 629 | 20.3 | 0.66 | 12769 | 71 | 20 | 9 | 50 | 5.4 | 90 | 29 | Presence |

As illustrated in Tables 1 to 3, in Comparative Examples 1 to 4, in which a steel component composition or manufacturing conditions deviated from compositions and conditions of an exemplary embodiment in the present disclosure, a microstructure was not secured in each structural fraction, hardness ratio, concentration ratio, and the like, required according to an exemplary embodiment, a yield ratio exceeded 0.6, and a value of product of tensile strength and ductility (TS×El) was less than 16000 MPa %, and thus, formability required in the exemplary embodiment may not be secured. In addition, it can be confirmed that all of the examples were poor in terms of plating properties and unplated portions occurred therein.

On the other hand, in Inventive Examples 1 to 6, in which a steel component composition and manufacturing conditions satisfy all requirements of an exemplary embodiment in the present disclosure, as a required microstructure is formed, a yield ratio is relatively low as 0.6 or less, and a value of product (TS×El) of tensile strength and ductility is relatively high as 16000 MPa % or more. Thus, formability required in an exemplary embodiment may be secured. In addition, plating properties are provided as good results.

Results obtained by observing microstructures of Inventive Example 1 and Comparative Example 2 with a microscope are illustrated in FIGS. 7 to 9.

Figure 7A:
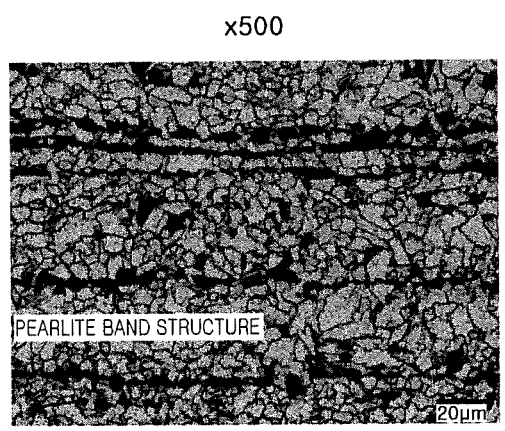
FIGS. 7A and 7B are images of microstructures after hot rolling in Comparative Example 2 (7A) and Inventive Example 1 (7B) in the present disclosure, observed with an optical microscope (OM)
Figure 7B:
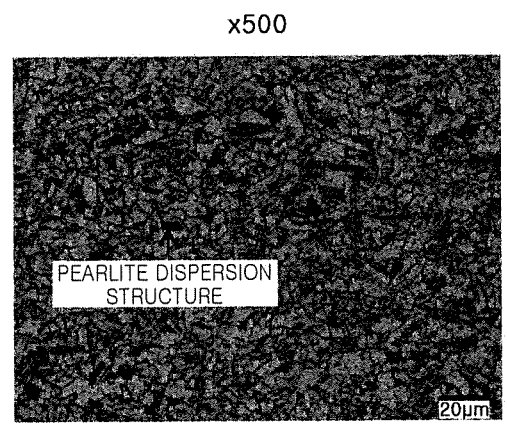

FIGS. 7A and 7B are images of microstructures after hot rolling, observed with an optical microscope. It can be confirmed that in Comparative Example 2 (7A), a pearlite band structure was formed and clearly observed, while in Inventive Example 1 (7B), pearlite was dispersively formed.

Figure 8A:
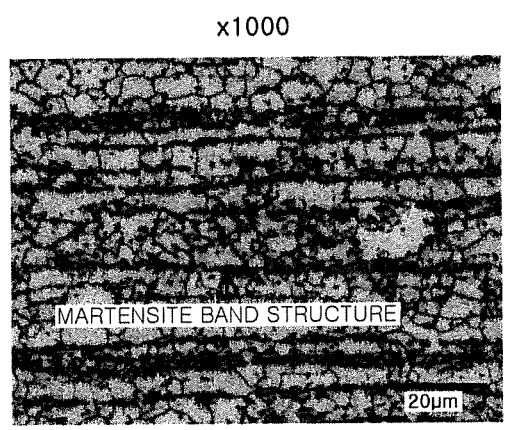
FIGS. 8A and 8B are images of microstructures after annealing in Comparative Example 2 (8A) and Inventive Example 1 (8B) in the present disclosure, observed with an optical microscope (OM)
Figure 8B:
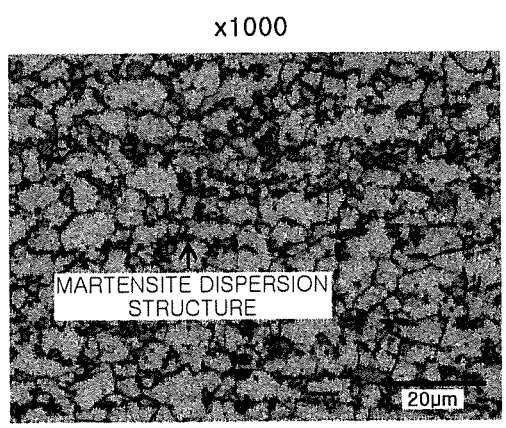

FIGS. 8A and 8B are images of microstructures after continuous annealing, observed with an optical microscope. It can be confirmed that in Comparative Example 2 (8A), a martensite band structure was formed, while in Inventive Example 1 (8B), martensite was dispersively formed.

Figure 9A:
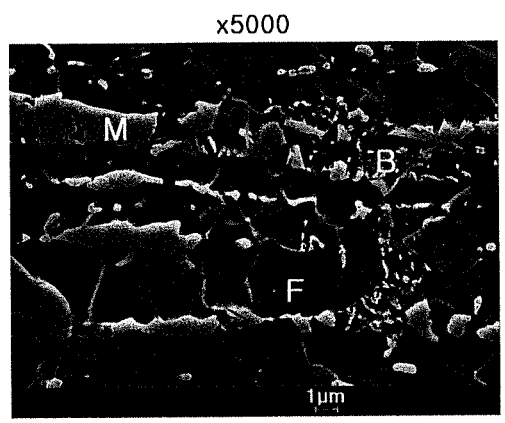
FIGS. 9A and 9B are images of microstructures after annealing in Comparative Example 2 (9A) and Inventive Example 1 (9B) in the present disclosure, observed with a scanning electron microscope (SEM)
Figure 9B:
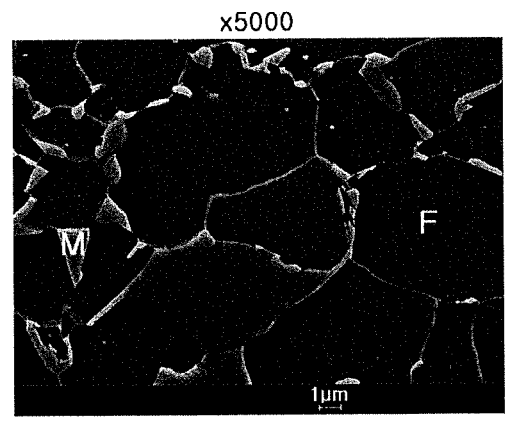

FIGS. 9A and 9B are images of microstructures after continuous annealing, observed with a scanning electron microscope. It can be confirmed that in Comparative Example 2 (9A), a bainite phase was observed in addition to martensite and ferrite, while in Inventive Example 1 (9B), a bainite phase was not observed.

Figure 10A:
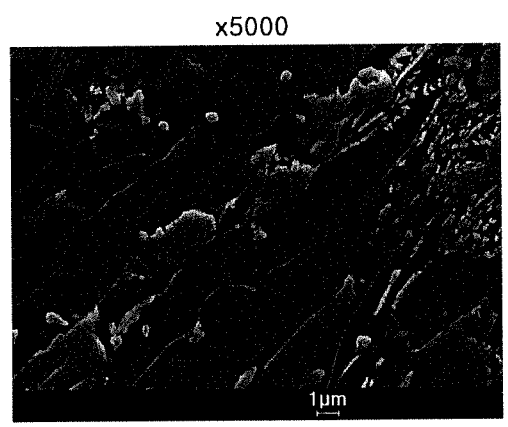
FIGS. 10A and 10B are images illustrating generation and coalescence behavior of microvoids according to tensile deformation in Comparative Example 2 (10A) and Inventive Example 1 (10B) in the present disclosure, observed with a scanning electron microscope (SEM).
Figure 10B:
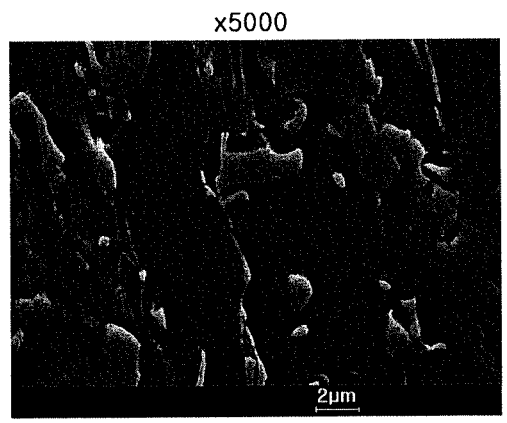

Further, FIGS. 10A and 10B illustrate microscopic observation results of ductile fracture behavior, and microstructures of vertical breakage surface lower portions of tensile specimens obtained by tensile tests of Inventive Example 1 and Comparative Example 2.

Ductile fracture may generally form voids by martensite and ferrite interfaces or cracking of martensite itself, and the voids may grow according to an increase in external stress and may be combined with voids grown simultaneously therewith in a vicinity thereof, to thus lead to breakage.

As illustrated in FIG. 10, in the case of Comparative Example 2 (10A), due to a martensite band structure (a portion thereof including bainite) formed lengthwise in a rolling direction, local stress and strain may be concentrated in this portion. Thus, it can be confirmed that a combination of voids easily occurs and breakage easily occurs.

On the other hand, in the case of Inventive Example 1 (10B), since ferrite has a structure in which martensite is uniformly dispersed, local stress and strain may be relieved, to thus delay combination of voids and increase ductile fracture resistance, thereby increasing ductility of a steel sheet.

As set forth above, according to an exemplary embodiment, a steel sheet having excellent strength and ductility and a relatively low yield ratio and excellent surface qualities may be provided. The steel sheet according to an exemplary embodiment as above may be variously used as automobile exterior panels requiring relatively high formability.

Further, since both the quality and plating characteristics of a steel sheet may be secured according to an exemplary embodiment, various cold-rolled steel sheets and plated steel sheets may be effectively manufactured.

While example embodiments have been shown and described above, it will be apparent to those skilled in the art that modifications and variations could be made without departing from the scope of the present disclosure as defined by the appended claims.

What is claimed is:
1. A steel sheet, comprising:
by weight %, 0.02% to 0.1% of carbon (C), 1.3% to 2.0% of manganese (Mn), more than 0% to 0.2% or less of silicon (Si), 0.5% to 1.5% of chromium (Cr), more than 0% to 0.1% or less of phosphorus (P), more than 0% to 0.01% or less of sulfur (S), more than 0% to 0.01% or less of nitrogen (N), 0.01% to 0.06% of soluble aluminum (sol.Al), more than 0% to 0.2% or less of molybdenum (Mo), more than 0% to 0.003% or less of boron (B), and iron (Fe) and inevitable impurities as remainders thereof; and by an area fraction, ferrite (F) of 80% or more, martensite (M) of 20% or less (excluding 0%), and bainite (B) of 5% or less, as a microstructure, wherein in a matrix structure at a thickness ¼T point of the steel sheet, a ratio ($C_M/C_F$) of a carbon (C) average concentration ($C_M$) in a martensite phase and a C average concentration ($C_F$) in a ferrite phase is 50 or less, and a ratio ($Cr_F/C_F$) of a Cr average concentration ($Cr_F$) in a ferrite phase and a C average concentration ($C_F$) in a ferrite phase is 60 or more, where in ¼T, T indicates a thickness in mm of the steel sheet.

2. The steel sheet of claim 1, wherein the steel sheet comprises carbon (C) of 0.02 to 0.08 weight %.

3. The steel sheet of claim 1, wherein a content relationship between chromium (Cr) and carbon (C) in the matrix structure at the thickness ¼T point satisfies the following Relational Expression 1, $$Cr/(C+Cr) \geq 0.8$$ [Relational Expression 1]

where Cr and C indicate weight contents of respective elements.

4. The steel sheet of claim 1, wherein a ratio ($H_M/H_F$) of hardness ($H_M$) of the martensite phase and hardness ($H_F$) of the ferrite phase is 4 or less.

5. The steel sheet of claim 1, wherein in the steel sheet, a yield ratio (YR=YS/TS) is 0.6 or less, and a product of tensile strength (TS, MPa)×ductility (El) is 16000 MPa % or more.

6. The steel sheet of claim 1, wherein the steel sheet is one of a cold-rolled steel sheet, a hot-dip galvanized steel sheet, and an alloyed galvanneled steel sheet.

* * * * *